US008923632B2

(12) United States Patent
Sample et al.

(10) Patent No.: US 8,923,632 B2
(45) Date of Patent: Dec. 30, 2014

(54) SYSTEM AND METHOD FOR ENCODING STANDARD-FORMATTED IMAGES WITH INFORMATION

(71) Applicants: John T. Sample, Pearl River, LA (US); Elias Z K Ioup, New Orleans, LA (US)

(72) Inventors: John T. Sample, Pearl River, LA (US); Elias Z K Ioup, New Orleans, LA (US)

(73) Assignee: The United States of America, as Represented by the Secretary of the Navy, Washington, DC (US)

( * ) Notice: Subject to any disclaimer, the term of this patent is extended or adjusted under 35 U.S.C. 154(b) by 153 days.

(21) Appl. No.: 13/657,092

(22) Filed: Oct. 22, 2012

(65) Prior Publication Data
US 2014/0112587 A1   Apr. 24, 2014

(51) Int. Cl.
G06K 9/36 (2006.01)
(52) U.S. Cl.
USPC .......................................................... 382/232
(58) Field of Classification Search
None
See application file for complete search history.

(56) References Cited

U.S. PATENT DOCUMENTS

| 7,463,565 | B2 | 12/2008 | Naydon et al. | |
| 7,562,289 | B2 | 7/2009 | Bufkin et al. | |
| 8,271,544 | B2 | 9/2012 | Chan et al. | |
| 2004/0190784 | A1* | 9/2004 | Ozawa et al. | 382/232 |
| 2005/0165847 | A1* | 7/2005 | Kusama et al. | 707/104.1 |
| 2006/0117183 | A1* | 6/2006 | Hatano et al. | 713/176 |
| 2006/0265689 | A1* | 11/2006 | Kuznetsov et al. | 717/117 |
| 2006/0269158 | A1* | 11/2006 | O'Hara et al. | 382/254 |
| 2008/0281509 | A1 | 11/2008 | Hsieh et al. | |
| 2010/0281070 | A1* | 11/2010 | Chan et al. | 707/803 |

OTHER PUBLICATIONS

Lake, R., Burggraf, D., Kyle, M., and Forde, S., GML in JPEG 2000 for Geographic Imagery (GMLJP2) Implementation Specification, 2005, Open Geospatial Consortium Inc., pp. 1-155.*
Gerlek, M.P., The "GeoTIFF Box" Specification for JPEG 2000 Metadata, 2004, LizardTech, Inc., pp. 1-6.*

* cited by examiner

Primary Examiner — Stephen R Koziol
Assistant Examiner — Jonathan S Lee
(74) Attorney, Agent, or Firm — US Naval Research Laboratory; Kathleen Chapman

(57) ABSTRACT

System and method for encoding standard-formatted images with information including, but not limited to, geospatial information. This information, possibly in mark-up language format, can be quickly accessed and this enables the standard-formatted images to be shown in geospatial information systems as map images, while preserving their compatibility with other systems like web browsers and mobile phones.

18 Claims, 3 Drawing Sheets

SYSTEM AND METHOD FOR ENCODING STANDARD-FORMATTED IMAGES WITH INFORMATION

CROSS-REFERENCE TO RELATED APPLICATIONS

None

BACKGROUND

Systems and methods disclosed herein relate generally to augmenting existing standard-formatted images. Standard image formats such as PNG, JPEG, and others are widely used, but there is no standard way, or sometimes no way, to attach information to those kinds of files, and therefore no standard way to process any attached information, if any. These formats have some ability to store image metadata, but existing methods for storing metadata suffer several problems. First, they are format-specific, for example, a method for attaching metadata to a JPEG file is different from a method for attaching metadata to a PNG file. Second, existing methods do not specifically allow for addition of geospatial metadata. Third, existing methods embed metadata within the structure of the image in varying positions based on image format. For example, the GeoTIFF format adds rich geospatial tags to standard TIFF images. However, TIFF images are not as widely used as JPEGs and PNGs. Also, GeoTIFF tags do not support the full expressiveness offered by an extensible mark-up language, for example, but not limited to, XML.

What is needed is a system in which images could be encoded within images, images could be signed digitally, change history could be encoded, and image labels and other annotations could be encoded along with the image. These capabilities exist for PDF documents, but not for other formats and not in a way that can be processed in a standard way.

SUMMARY

The system and method of the present embodiment address the needs of encoding standard-formatted images with information, for example, but not limited to, geospatial information. The system and method of the present embodiment allow geospatial information, such as map coordinates, scale, projection, datum, and others to be attached to standard-formatted images such as, for example, but not limited to, PNG, TIFF, BMP, GIF, JPEG, and many other image types. This enables the standard-formatted images to be shown in geospatial information systems as map images, while preserving their compatibility with other systems like web browsers and mobile phones.

The system and method of the present embodiment provide for attaching information to any image, regardless of format, in a way that can be processed with the same computer code by any reader, regardless of the format of the standard-formatted image. The structure of the new format allows the standard-formatted image to be readable in the current way as well as by technology that could make use of the attached information. Adding data to the end of a standard-formatted image file preserves compatibility with all known image readers. Finalizing the additional data with a special tag allows computer code to quickly determine if the additional data are present. Including the size of the attached information, perhaps formatted in XML format, allows computer code to quickly retrieve the attached information. The XML format itself provides a rich, extensible set of capabilities for example, but not limited to, embedding thumbnail or alternative images of the standard-format image, encoding digital signature information, providing document change history, and providing labels and annotations for the standard-format image. The user can also define data specific to the particular standard-format image.

DETAILED DESCRIPTION

The problems set forth above as well as further and other problems are solved by the present teachings. These solutions and other advantages are achieved by the various embodiments of the teachings described herein below.

Figure 1:
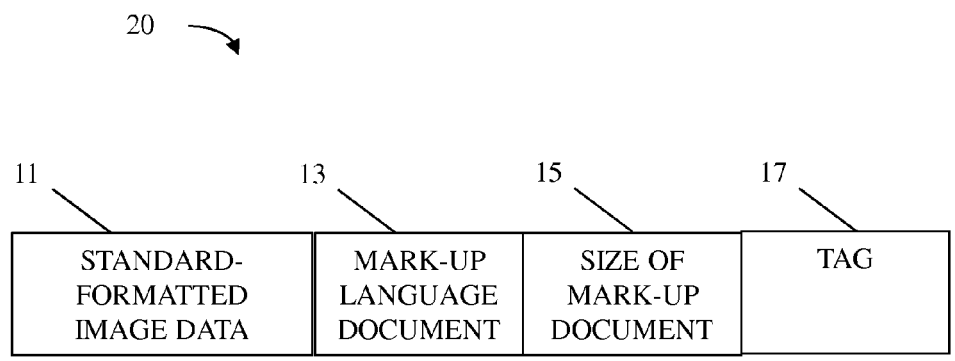
FIG. 1 is a pictorial representation of the data structure of the image of the present embodiment.

Referring now to FIG. 1, the system and method of the present embodiment add a mark-up language document to the end of any standard image format by using modified format 20. The system and method of the present embodiment create, for example, but not limited to, an XML schema document that outlines the proper, but extensible, structure of the XML documents that can be appended to image files. Standard image format 11 is image data in a standard format such as, for example, but not limited to, PNG, TIFF, BMP, GIF, JPEG, and any other image format. Standard image format 11 is exactly as any standard image would be, the internals are unchanged. Following standard image format 11 is mark-up language document 13 encoded as bytes, followed by document size 15 in bytes. Mark-up language document 13 can include, for example, but not limited to, print-related information, such as, for example, but not limited to, the trimming bounds for a printed image, and the Dots Per Inch (DPI) of the printed image. Mark-up language document 13 can also include information about the collection of the image, for example, but not limited to, the camera model, the satellite model, and the time and date of image capture. Still further, mark-up language document 13 can include the classification markings for the image. Attaching document size 15 to the image file allows quick retrieval of the size of mark-up language document 13. Magic number 17, eight bytes long and can be any number, follows document size 15. It is a tag indicating that a record has been added.

Figure 2:
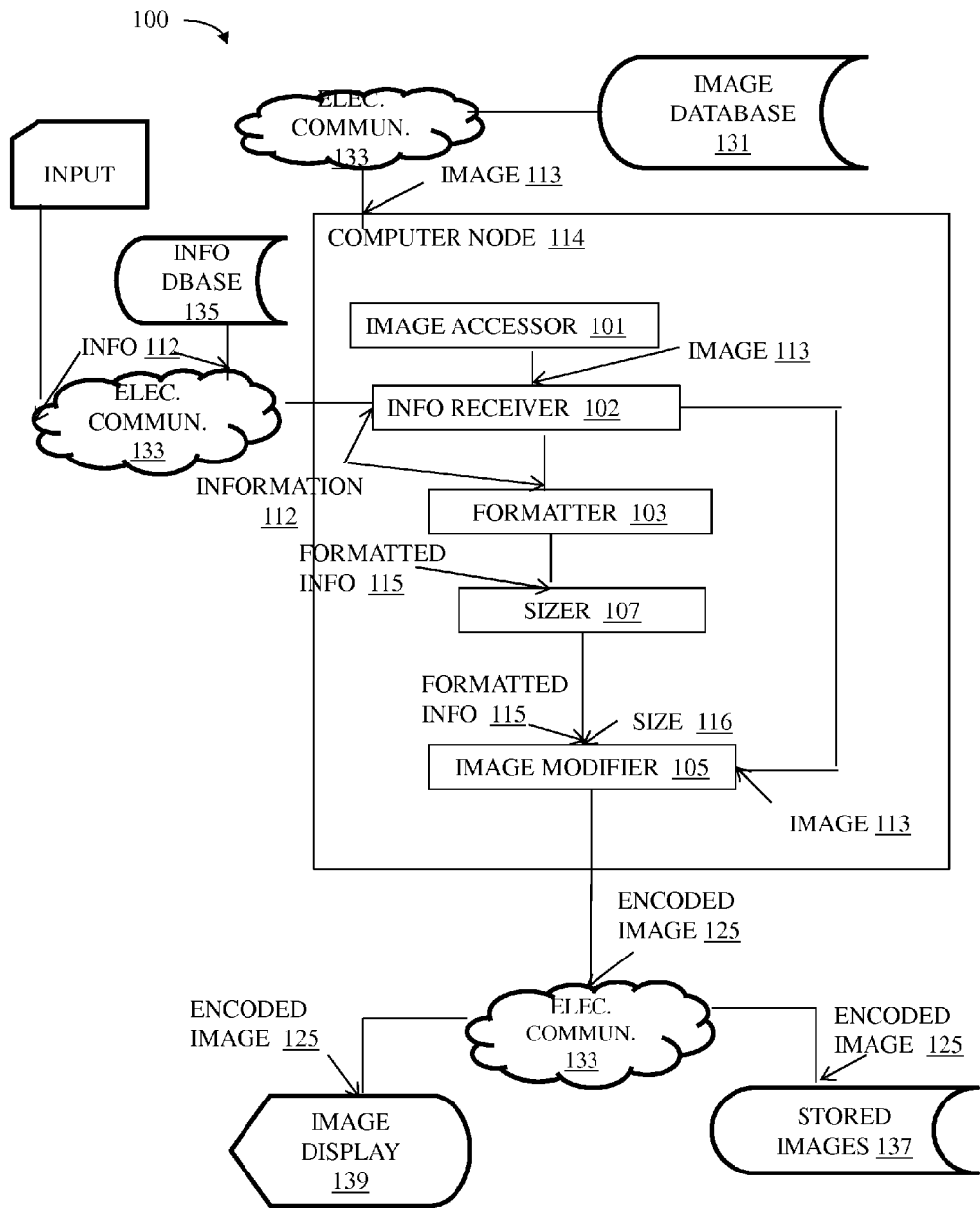
FIG. 2 is a schematic block diagram of one embodiment of the system of the present teachings.

Referring now to FIG. 2, system 100 for encoding standard-formatted images 113 with associated information 112 can include, but is not limited to including, image accessor 101 automatically accessing standard-formatted image 113 from, for example, but not limited to, image database 131 through, for example, but not limited to, electronic communications 133. System 100 can also include information receiver 102 automatically receiving information 112 associated with standard-formatted image 113 from, for example, but not limited to, user input or information database 135 through, for example, but not limited to, electronic communications 133. System 100 can still further include formatter 103 automatically formatting information 112 into formatted information 115 which is formatted according to a mark-up language, and sizer 107 automatically computing size 116 of formatted information 115. System 100 can also include image modifier 105 automatically creating encoded standard-formatted image 125 by concatenating formatted information 115, size 116, and a tag onto standard-formatted image 113.

Image modifier 105 can optionally provide encoded image 125 to, for example, but not limited to, image display 139 or stored images 137 through, for example, but not limited to, electronic communications 133. Information 112 can optionally include geospatial information, a digital signature, or document change history. The mark-up language can optionally be XML. The standard-formatted image can optionally be, for example, but not limited to, a JPEG image, a PNG image, a TIFF image, a BMP image, a GIF image, or any other image type. The tag can optionally include eight bytes.

Figure 3:
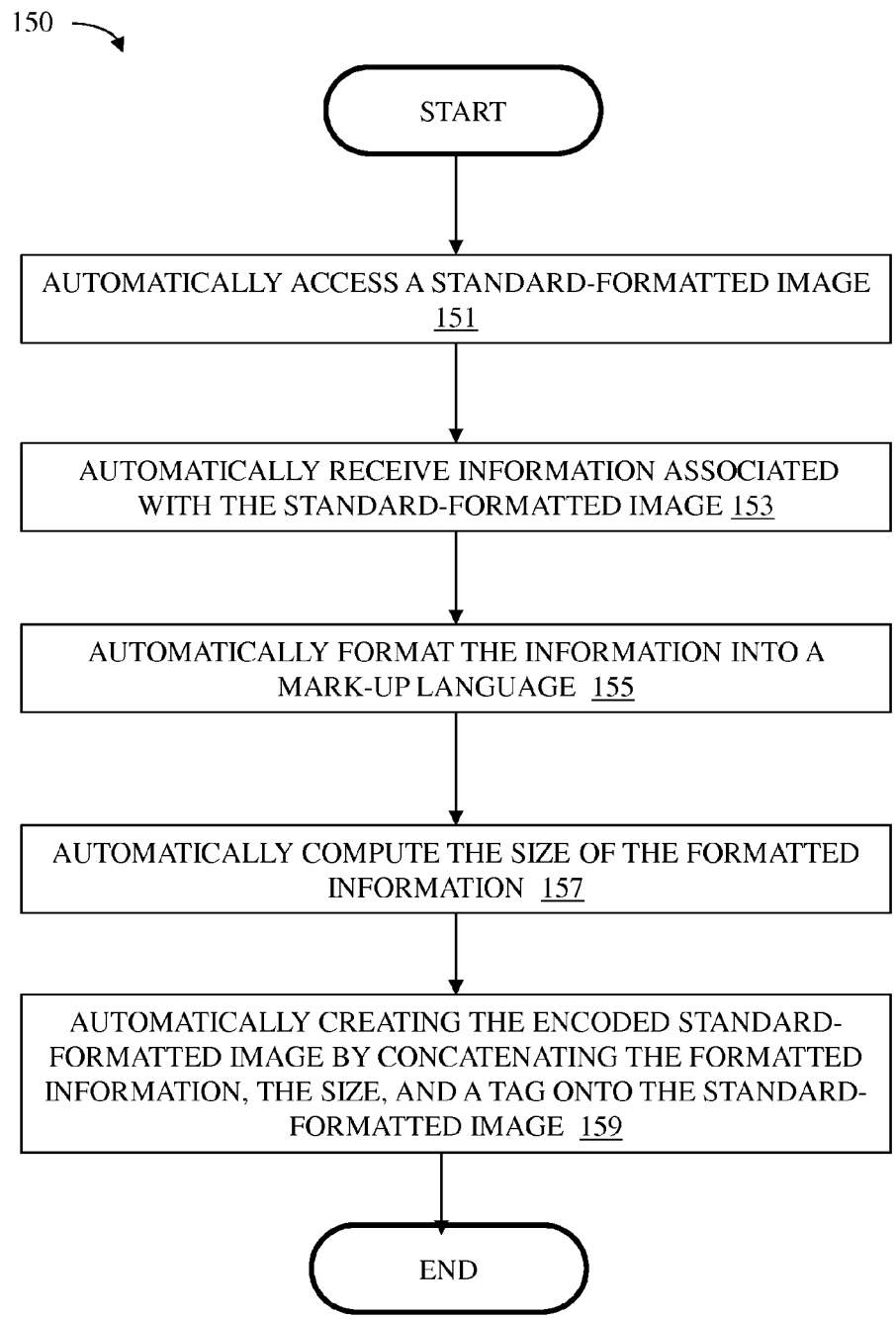
FIG. 3 is a flowchart of the method of one embodiment of the present teachings.

Referring now to FIG. 3, method 150 for encoding standard-formatted images with associated information can include, but is not limited to including, the steps of automatically accessing 151 a standard-formatted image, automatically receiving 153 information associated with the standard-formatted image, automatically formatting 155 the information into a mark-up language, automatically computing 157 the size of the formatted information, and automatically creating 159 the encoded standard-formatted image by concatenating the formatted information, the size, and a tag onto the standard-formatted image. The information can optionally include geospatial information, at least one digital signature, and document change history. The mark-up language can be, for example, but not limited to, XML. The standard-formatted image can be, for example, but not limited to, a JPEG image, a PNG image, a TIFF image, a BMP image, a GIF image, or any other image type. The tag can optionally include, for example, eight bytes.

Embodiments of the present teachings are directed to computer systems for accomplishing the methods discussed in the description herein, and to computer readable media containing programs for accomplishing these methods. The raw data and results can be stored for future retrieval and processing, printed, displayed, transferred to another computer, and/or transferred elsewhere. Communications links can be wired or wireless, for example, using cellular communication systems, military communications systems, and satellite communications systems. In an exemplary embodiment, the software for the system is written in FORTRAN and C. The system operates on a computer having a variable number of CPUs. Other alternative computer platforms can be used. The operating system can be, for example, but is not limited to, WINDOWS® or LINUX®.

The present embodiment is also directed to software for accomplishing the methods discussed herein, and computer readable media storing software for accomplishing these methods. The various modules described herein can be accomplished on the same CPU, or can be accomplished on a different computer. In compliance with the statute, the present embodiment has been described in language more or less specific as to structural and methodical features. It is to be understood, however, that the present embodiment is not limited to the specific features shown and described, since the means herein disclosed comprise preferred forms of putting the present embodiment into effect.

Referring again primarily to FIG. 3, method 150 can be, in whole or in part, implemented electronically. Signals representing actions taken by elements of system 100 (FIG. 2) and other disclosed embodiments can travel over at least one live communications network and/or through electronic communications 133 (FIG. 2). Control and data information can be electronically executed and stored on at least one computer-readable medium. The system can be implemented to execute on at least one computer node 114 (FIG. 2) in at least one live communications network and/or through electronic communications 133 (FIG. 2). Common forms of at least one computer-readable medium can include, for example, but not be limited to, a floppy disk, a flexible disk, a hard disk, magnetic tape, or any other magnetic medium, a compact disk read only memory or any other optical medium, punched cards, paper tape, or any other physical medium with patterns of holes, a random access memory, a programmable read only memory, and erasable programmable read only memory (EPROM), a Flash EPROM, or any other memory chip or cartridge, or any other medium from which a computer can read. Further, the at least one computer readable medium can contain images in any form including, but not limited to, Graphic Interchange Format (GIF), Joint Photographic Experts Group (JPEG), Portable Network Graphics (PNG), Scalable Vector Graphics (SVG), and Tagged Image File Format (TIFF).

The invention has been described with reference to certain embodiments. It will be understood, however, that the invention is not limited to the embodiments discussed above, and that modification and variations are possible within the scope of the appended claims.

What is claimed is:

1. An automatic method for displaying a standard formatted image in a geospatial information system as a map image comprising:
  automatically accessing an augmented standard-formatted image, the augmented standard-formatted image including the standard-formatted image, mark-up language information, a mark-up language information size, and a tag at the end of the augmented standard-formatted image;
  automatically searching for the tag at the end of the augmented standard-formatted image;
  if the tag is found, automatically retrieving the mark-up language information size from a pre-selected position relative to the tag and the mark-up language information according to the mark-up language information size;
  automatically decoding the mark-up language information; and
  automatically displaying the standard-formatted image as the map image based on the decoded mark-up language information;
  wherein the information includes a digital signature.

2. The method as in claim 1 wherein the information further comprises geospatial information.

3. The method as in claim 1 wherein the information further comprises document change history.

4. The method as in claim 1 wherein the mark-up language comprises XML.

5. The method as in claim 1 wherein the standard-formatted image comprises any of a JPEG image, a PNG image, a TIFF image, a BMP image, a GIF image.

6. The method as in claim 1 wherein the tag comprises eight bytes.

7. A computer system for displaying a standard formatted image in a geospatial information system as a map image comprising:
  an image accessor automatically accessing the standard-formatted image;
  an information receiver automatically receiving information associated with the standard-formatted image;
  a formatter automatically formatting the information into mark-up language information;
  a sizer automatically computing a mark-up language information size of the mark-up language information;
  an image modifier automatically creating an augmented standard-formatted image by concatenating the standard-formatted information, the mark-up language information size, and a tag onto the standard-formatted image, the tag being concatenated at the end of the augmented standard-formatted image; and an image display automatically displaying the augmented standard-formatted image if the augmented standard-formatted image includes the tag at the end, wherein the information includes a digital signature.

8. The method as in claim 7 wherein the information further comprises geospatial information.

9. The method as in claim 7 wherein the information further comprises document change history.

10. The method as in claim 7 wherein the mark-up language comprises XML.

11. The method as in claim 7 wherein the standard-formatted image comprises any of a JPEG image, a PNG image, a TIFF image, a BMP image, a GIF image.

12. The method as in claim 7 wherein the tag comprises eight bytes.

13. A computer method for displaying a standard formatted image in a geospatial information system as a map image comprising:

computer code stored on computer-readable media executing automatically accessing an augmented standard-formatted image, the augmented standard-formatted image including the standard-formatted image, mark-up language information, a mark-up language information size, and a tag at the end of the augmented standard-formatted image;

automatically searching for the tag at the end of the augmented standard-formatted image;

if the tag is found, automatically retrieving the mark-up language information size from a pre-selected position relative to the tag and the mark-up language information according to the mark-up language information size;

automatically decoding the mark-up language information; and automatically displaying the standard-formatted image as the map image based on the decoded mark-up language information, wherein the information includes a digital signature.

14. The computer system as in claim 13 wherein the information further comprises a document change history.

15. The computer system as in claim 13 wherein the mark-up language comprises XML.

16. The computer system as in claim 13 wherein the standard-formatted image comprises any of a JPEG image, a PNG image, a TIFF image, a BMP image, a GIF image.

17. The computer system as in claim 13 wherein the tag comprises eight bytes.

18. The computer system as in claim 13 wherein the information further comprises geospatial information.

* * * * *